United States Patent
Glasgow (10) Patent No.: US 9,552,598 B2
(45) Date of Patent: Jan. 24, 2017

(54) MOBILE TRIGGER WEB WORKFLOW

(71) Applicant: Dane Glasgow, Los Altos, CA (US)

(72) Inventor: Dane Glasgow, Los Altos, CA (US)

(73) Assignee: eBay Inc., San Jose, CA (US)

(*) Notice: Subject to any disclaimer, the term of this patent is extended or adjusted under 35 U.S.C. 154(b) by 182 days.

(21) Appl. No.: 13/650,389

(22) Filed: Oct. 12, 2012

(65) Prior Publication Data

US 2014/0108482 A1     Apr. 17, 2014

(51) Int. Cl.
| | |
|---|---|
| G06F 15/16 | (2006.01) |
| G06Q 30/06 | (2012.01) |
| G06Q 10/06 | (2012.01) |
| G06F 21/30 | (2013.01) |
| G06F 9/44 | (2006.01) |
| H04L 29/06 | (2006.01) |
| H04L 29/08 | (2006.01) |
| G06Q 30/02 | (2012.01) |

(52) U.S. Cl.
CPC ............... *G06Q 30/06* (2013.01); *G06F 9/44* (2013.01); *G06F 21/305* (2013.01); *G06Q 10/06316* (2013.01); *G06Q 30/0282* (2013.01); *H04L 29/06* (2013.01); *H04L 29/08072* (2013.01)

(58) Field of Classification Search
CPC ............... H04L 29/08072; H04L 29/06; G06Q 10/06316; G06Q 30/06; G06F 21/305; G06F 9/44
USPC .......................................................... 709/201
See application file for complete search history.

(56) References Cited

U.S. PATENT DOCUMENTS

| | | | |
|---|---|---|---|
| 6,571,246 B1 | 5/2003 | Anderson et al. | |
| 9,374,517 B2 | 6/2016 | Glasgow | |
| 2003/0177448 A1* | 9/2003 | Levine et al. | 715/530 |
| 2004/0138898 A1* | 7/2004 | Elbrader | 705/1 |
| 2004/0189829 A1 | 9/2004 | Fukuda et al. | |
| 2005/0007468 A1 | 1/2005 | Stavely et al. | |
| 2005/0228683 A1* | 10/2005 | Saylor et al. | 705/1 |
| 2005/0257148 A1 | 11/2005 | Goodman et al. | |
| 2007/0057815 A1 | 3/2007 | Foy et al. | |
| 2007/0061856 A1 | 3/2007 | Seki et al. | |
| 2007/0182823 A1 | 8/2007 | Maruyama et al. | |
| 2008/0180721 A1* | 7/2008 | Ferlitsch | 358/1.15 |

(Continued)

FOREIGN PATENT DOCUMENTS

| | | |
|---|---|---|
| CN | 101690164 A | 3/2010 |
| CN | 102025829 A | 4/2011 |

(Continued)

OTHER PUBLICATIONS

"International Application Serial No. PCT/US2013/064132, International Search Report mailed Dec. 24, 2013", 2 pgs.

(Continued)

*Primary Examiner* — Chris Parry
*Assistant Examiner* — Weiwei Stiltner
(74) *Attorney, Agent, or Firm* — Schwegman, Lundberg & Woessner, P.A.

(57) ABSTRACT

In an example embodiment, actions taken on a web site using one device initiate a workflow on a different device. A main process, including a series of steps, is executed on one user device. When a particular step in the main process is reached, a secondary process is then initiated on another device, such as a mobile device.

12 Claims, 10 Drawing Sheets

(56) References Cited

U.S. PATENT DOCUMENTS

| | | | |
|---|---|---|---|
| 2008/0189365 A1* | 8/2008 | Narayanaswami | H04L 67/16 709/204 |
| 2009/0106127 A1* | 4/2009 | Purdy et al. | 705/27 |
| 2009/0158220 A1 | 6/2009 | Zalewski et al. | |
| 2009/0207279 A1 | 8/2009 | Ochi et al. | |
| 2010/0114736 A1 | 5/2010 | Lewis et al. | |
| 2010/0217684 A1 | 8/2010 | Melcher et al. | |
| 2011/0004841 A1 | 1/2011 | Gildred et al. | |
| 2011/0063325 A1 | 3/2011 | Saunders | |
| 2011/0105339 A1* | 5/2011 | Al Moussalami | 506/6 |
| 2011/0145713 A1 | 6/2011 | Williams et al. | |
| 2011/0201939 A1 | 8/2011 | Hubschman et al. | |
| 2011/0216209 A1 | 9/2011 | Fredlund et al. | |
| 2011/0251916 A1 | 10/2011 | Sipper | |
| 2012/0011593 A1* | 1/2012 | Oka | 726/27 |
| 2012/0062758 A1* | 3/2012 | Devine et al. | 348/222.1 |
| 2012/0179609 A1 | 7/2012 | Agarwal et al. | |
| 2012/0259738 A1 | 10/2012 | Pillai | |
| 2012/0310669 A1* | 12/2012 | Carlberg et al. | 705/3 |
| 2014/0019303 A1* | 1/2014 | Argue et al. | 705/26.64 |
| 2014/0028866 A1* | 1/2014 | Miyachi et al. | 348/211.99 |
| 2014/0063344 A1* | 3/2014 | Dureau | 348/552 |
| 2014/0085334 A1* | 3/2014 | Payne | H04M 3/42382 345/633 |
| 2014/0104379 A1 | 4/2014 | Glasgow | |
| 2014/0108559 A1* | 4/2014 | Grochowicz | H04N 21/4622 709/206 |
| 2016/0073014 A1 | 3/2016 | Glasgow | |

FOREIGN PATENT DOCUMENTS

| | | |
|---|---|---|
| CN | 104169794 A | 11/2014 |
| KR | 1020110060297 A | 6/2011 |
| WO | WO-2009006949 A1 | 1/2009 |
| WO | WO-2009053863 A1 | 4/2009 |
| WO | WO-2014059018 A1 | 4/2014 |
| WO | WO-2014059307 A2 | 4/2014 |
| WO | WO-2014059307 A3 | 4/2014 |

OTHER PUBLICATIONS

"International Application Serial No. PCT/US2013/064132, Written Opinion mailed Dec. 24, 2013", 4 pgs.

"International Application Serial No. PCT/US2013/064594, International Search Report mailed Apr. 17, 2014", 2 pgs.

"International Application Serial No. PCT/US2013/064594, Written Opinion mailed Apr. 17, 2014", 6 pgs.

"U.S. Appl. No. 13/650,372, Examiner Interview Summary mailed Nov. 28, 2014", 3 pgs.

"U.S. Appl. No. 13/650,372, Final Office Action mailed Mar. 30, 2015", 20 pgs.

"U.S. Appl. No. 13/650,372, Non Final Office Action mailed Oct. 23, 2014", 18 pgs.

"U.S. Appl. No. 13/650,372, Response filed Jan. 7, 2015 to Non Final Office Action mailed Oct. 23, 2014", 10 pgs.

"Australian Application Serial No. 2013328981, First Examiner Report mailed Aug. 8, 2014", 4 pgs.

"Australian Application Serial No. 2013328981, Response filed Feb. 18, 2015", 22 pgs.

"Australian Application Serial No. 2013328981, Response filed Dec. 8, 2014 to First Examiner Report mailed Aug. 8, 2014", 23 pgs.

"Australian Application Serial No. 2013328981, Subsequent Examiner Report mailed Dec. 10, 2014", 3 pgs.

"European Application Serial No. 13846072.0, Response filed Dec. 9, 2014", 11 pgs.

"Australian Application Serial No. 2013328981, Subsequent Examiners Report mailed Apr. 8, 2015", 3 pgs.

"International Application Serial No. PCT/US2013/064132, International Preliminary Report on Patentability mailed Apr. 23, 2015", 6 pgs.

"International Application Serial No. PCT/US2013/064594, International Preliminary Report on Patentability mailed Apr. 23, 2015", 8 pgs.

"U.S. Appl. No. 13/650,372, Examiner Interview Summary mailed Jun. 25, 2015", 3 pgs.

"U.S. Appl. No. 13/650,372, Notice of Allowance mailed Jul. 31, 2015", 9 pgs.

"U.S. Appl. No. 13/650,372, Response filed Jun. 29, 2015 to Final Office Action mailed Mar. 30, 2015", 12 pgs.

"Australian Application Serial No. 2013328981, Response filed Jun. 11, 2015 to Examiner's Report mailed Apr. 8, 2015", 22 pgs.

"Australian Application Serial No. 2013328981, Response filed Jul. 29, 2015 to Subsequent Examiner Report mailed Jun. 23, 2015", 2 pgs.

"Australian Application Serial No. 2013328981, Response filed Aug. 5, 2015", 20 pgs.

"Australian Application Serial No. 2013328981, Subsequent Examiners Report mailed Jun. 23, 2015", 3 pgs.

"Australian Application Serial No. 2013328981, Subsequent Examiners Report mailed Aug. 4, 2015", 3 pgs.

"European Application Serial No. 13846072.0, Extended European Search Report mailed Oct. 15, 2015", 18 pgs.

"U.S. Appl. No. 13/650,372, Corrected Notice of Allowance mailed May 5, 2016", 2 pgs.

"U.S. Appl. No. 13/650,372, Notice of Allowance mailed Feb. 26, 2016", 10 pgs.

"Canada Application Serial No. 2,861,827, Office Action mailed Nov. 13, 2015", 8 pgs.

"Canadian Application Serial No. 2,861,827, Response filed May 10, 2016 to Office Action mailed Nov. 13, 2015", 19 pgs "European Application Serial No. 13846072.0, Response filed May 2, 2016", 12 pgs.

"Korean Application Serial No. 2015-7012467, Office Action mailed Feb. 15, 2016", W/ English Translation of claims, 17 pgs.

"Korean Application Serial No. 2015-7012467, Response filed Apr. 14, 2016 to Office Action mailed Feb. 15, 2016", with English translation of claims, 27 pgs.

"Chinese Application Serial No. 201380014338.6, Office Action mailed Aug. 2, 2016", W/ English Translation, 15 pgs.

\* cited by examiner

MOBILE TRIGGER WEB WORKFLOW

TECHNICAL FIELD

This application relates to the technical fields of web pages and mobile devices and, in one example embodiment, a system and method to initiate web workflow from a mobile device and vice-versa.

BACKGROUND

With the dawn of mobile devices, users of web pages can sometimes encounter challenges with entering information when the user has both a traditional computer (e.g., laptop computer, desktop computer) and a mobile device (e.g., smartphone, tablet computer). In one example, a user may be entering an auction listing on a web site using a desktop computer, and the web site may ask the user to upload a photo of the item being sold. The user may utilize their mobile device to take the photo, but needs to transfer the photo to the desktop computer (e.g., plugging it in and synchronizing it, or mailing the photo to himself and opening it on the desktop computer). Only then can the user complete the listing session by uploading the photo. In another example, a user may begin a listing session on one device and then get interrupted and want to finish it on another device. For example, the user may begin entering the listing information on a desktop computer at home but then get called in to work and want to finish the listing on a work computer, or on a smartphone.

BRIEF DESCRIPTION OF DRAWINGS

Embodiments of the present invention are illustrated by way of example and not limitation in the figures of the accompanying drawings, in which like reference numbers indicate similar elements and in which.

DETAILED DESCRIPTION

Reference will now be made in detail to specific embodiments including the best modes contemplated by the inventors for carrying out the invention. Examples of these specific embodiments are illustrated in the accompanying drawings. It will be understood that it is not intended to limit the scope of the claims to the described embodiments. On the contrary, it is intended to cover alternatives, modifications, and equivalents as may be included within the spirit and scope of the disclosure as defined by the appended claims. In the following description, specific details are set forth in order to provide a thorough understanding of the subject matter. Embodiments may be practiced without some or all of these specific details. In addition, well known features may not have been described in detail to avoid unnecessarily obscuring the subject matter.

In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose or nature, such as hardwired devices, field programmable gate arrays (FPGAs), application specific integrated circuits (ASICs), or the like, may also be used without departing from the scope and spirit of the concepts disclosed herein. Embodiments may also be tangibly embodied as a set of computer instructions stored on a computer readable medium, such as a memory device.

In an example embodiment, actions taken on a web site using one device initiate a workflow on a different device. In one example embodiment, as a user works on an auction listing web page, progressing through a series of steps (e.g., entering a title, entering a starting price, entering a description, etc.), one of the steps (e.g., uploading a photo) triggers a workflow on another user device (such as a mobile device). The workflow in this example may be a workflow that asks the user to take a picture and then automatically uploads this picture to the web page.

In another example embodiment, state information about a user's web session is persisted within a server, allowing the user to restart the session from a different device than the one at which the session was begun. This allows the user to, for example, begin a web session at a desktop computer and complete the session on the user's mobile device. This process may either be explicitly requested by the user, or may be performed in the background. For example, a button may be provided for the user to indicate that he wishes to pause the session on one device and continue it on another. Alternatively, the system may simply assume that the session should be paused after a preset amount of time with no user input (e.g., a timeout occurs). The result is that the user experience can be pushed from one device to another.

Figure 1:
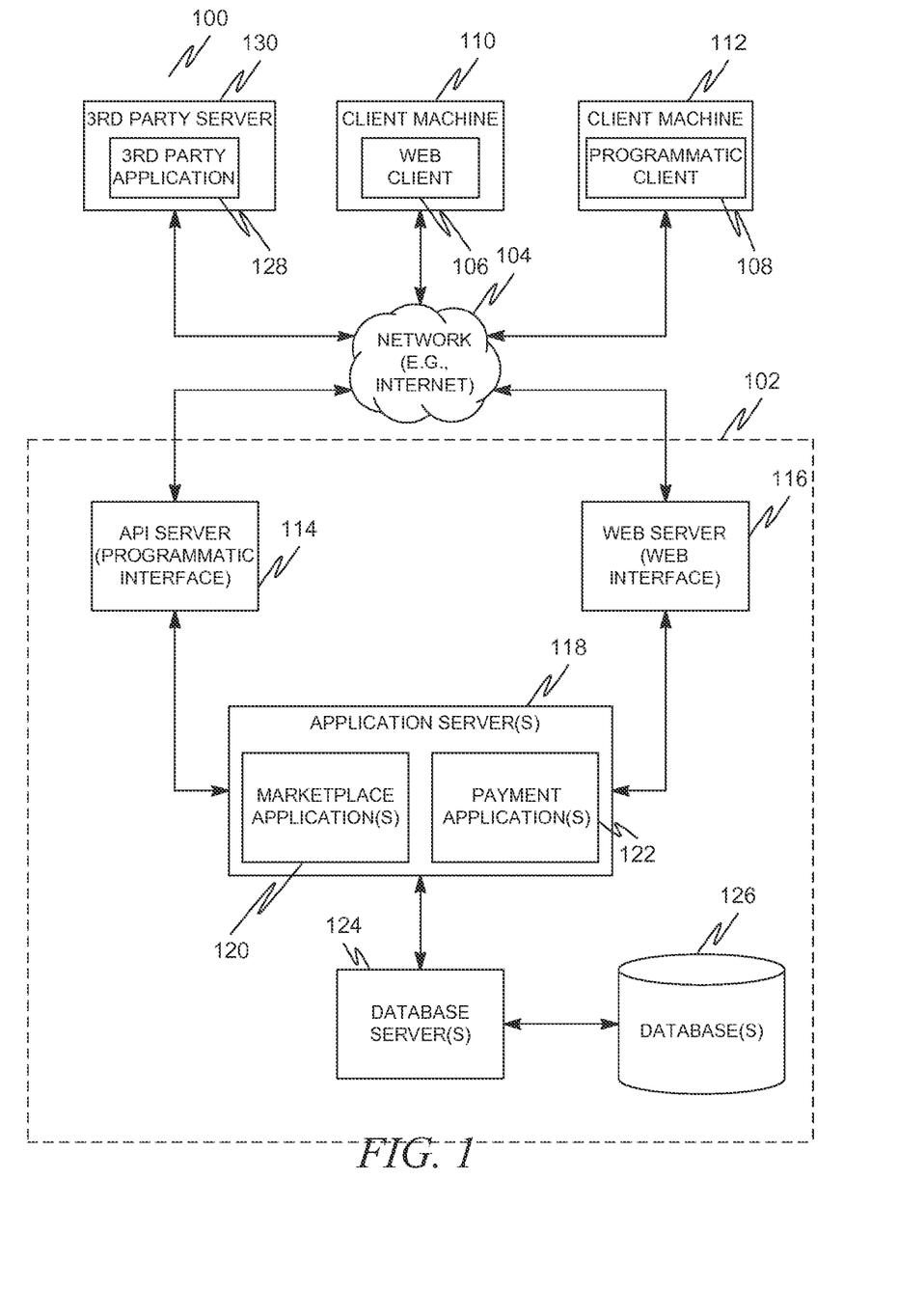
FIG. 1 is a network diagram depicting a client-server system, within which one example embodiment may be deployed.

FIG. 1 is a network diagram depicting a client-server system 100, within which one example embodiment may be deployed. A networked system 102, in the example form of a network-based marketplace or publication system, provides server-side functionality, via a network 104 (e.g., the Internet or wide area network (WAN)) to one or more clients. FIG. 1 illustrates, for example, a web client 106 (e.g., a browser, such as the Internet Explorer browser developed by Microsoft Corporation of Redmond, Wash. State), and a programmatic client 108 executing on respective client machines 110 and 112.

The respective client machines 110 and 112, in an example embodiment, are operated by the same user. They need not be simultaneously operated by the same user, of course. The user could, for example, utilize one client machine 110 and then at a later time operate the second client machine 112 (or vice-versa). The client machines 110 and 112 need not even be owned by the user—he could, in fact, be borrowing one or both client machines 110 and 112 temporarily. Nevertheless, in an example embodiment, the system can maintain state information about the user's operation of one of the client machines 110 or 112 and then use that state information to allow a user to resume a session on the other client machine 110 or 112. This operation will be described in more detail later.

An application program interface (API) server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more databases servers 124 that facilitate access to one or more databases 126.

The marketplace applications 120 may provide a number of marketplace functions and services to users that access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace and payment applications 120 and 122 are shown in FIG. 1 to both form part of the networked system 102, it will be appreciated that, in alternative embodiments, the payment application 122 may form part of a payment service that is separate and distinct from the networked system 102.

Further, while the system 100 shown in FIG. 1 employs a client-server architecture, the present invention is, of course, not limited to such an architecture, and could equally well find application in a distributed, or peer-to-peer, architecture system, for example. The marketplace and payment applications 120 and 122 could also be implemented as standalone software programs, which do not necessarily have networking capabilities.

The web client 106 accesses the marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace or payment functions that are supported by the relevant applications of the networked system 102.

Figure 2:
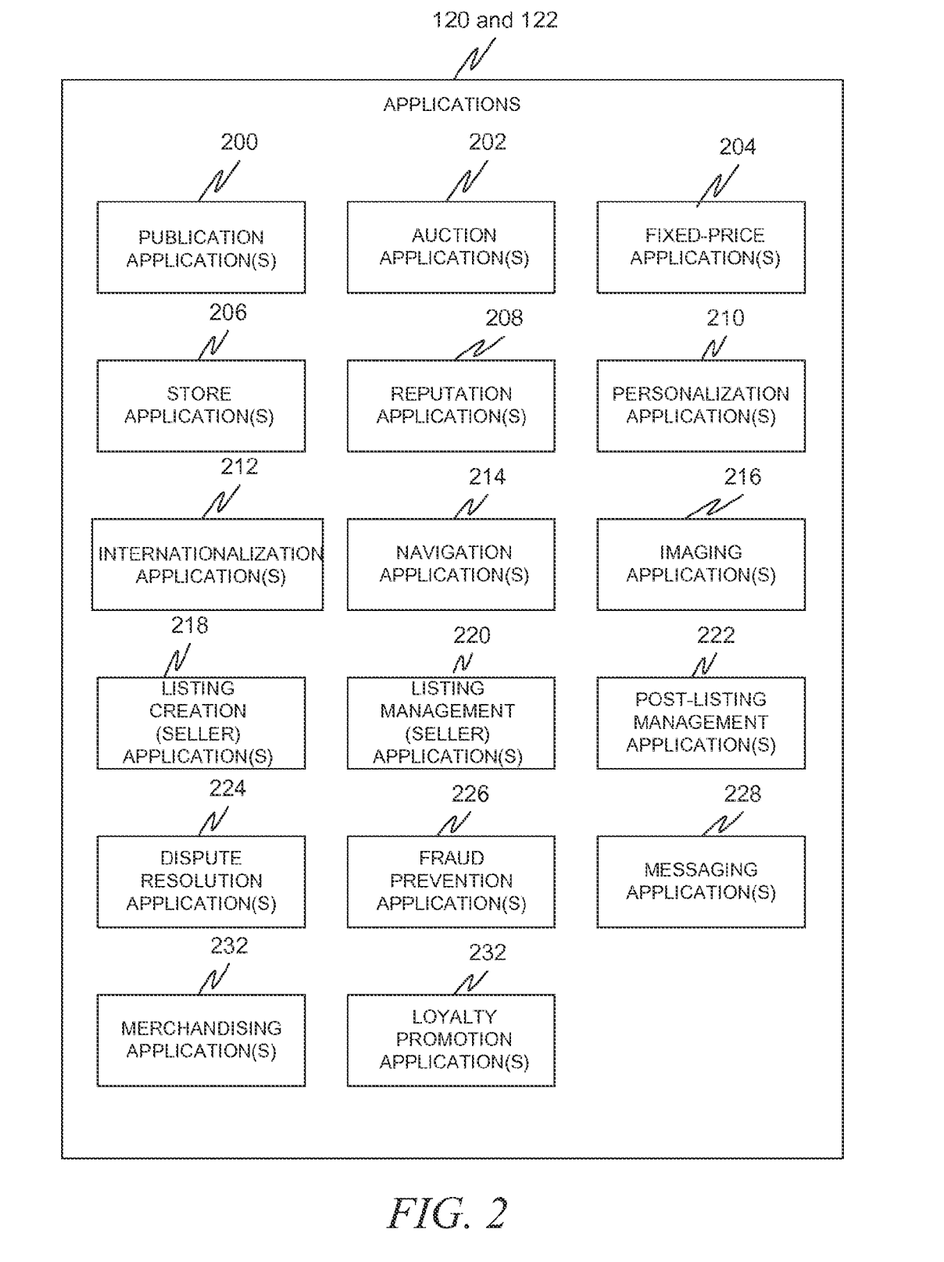
FIG. 2 is a block diagram illustrating multiple applications that, in one example embodiment, are provided as part of the networked system.

FIG. 2 is a block diagram illustrating multiple applications 120 and 122 that, in one example embodiment, are provided as part of the networked system 102. The applications 120 and 122 may be hosted on dedicated or shared server machines (not shown) that are communicatively coupled to enable communications between server machines. The applications 120 and 122 themselves are communicatively coupled (e.g., via appropriate interfaces) to each other and to various data sources, so as to allow information to be passed between the applications 120 and 122 or so as to allow the applications 120 and 122 to share and access common data. The applications 120 and 122 may furthermore access server one or more databases 126 via the database servers 128.

The networked system 102 may provide a number of publishing, listing and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace applications 120 are shown to include at least one publication application 200 and one or more auction applications 202 which support auction-format listing and price setting mechanisms (e.g., English, Dutch, Vickrey, Chinese, Double, Reverse auctions etc.). The various auction applications 202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 206 allow a seller to group listings within a "virtual" store, which may be branded and otherwise personalized by and for the seller. Such a virtual store may also offer promotions, incentives and features that are specific and personalized to a relevant seller.

Reputation applications 208 allow users that transact, utilizing the networked system 102, to establish, build and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 208 allow a user, for example through feedback provided by other transaction partners, to establish a reputation within the networked system 102 over time. Other potential trading partners may then reference such a reputation for the purposes of assessing credibility and trustworthiness.

Personalization applications 210 allow users of the networked system 102 to personalize various aspects of their interactions with the networked system 102. For example, a user may, utilizing an appropriate personalization application 210, create a personalized reference page at which information regarding transactions to which the user is (or has been) a party may be viewed. Further, a personalization application 210 may enable a user to personalize listings and other aspects of their interactions with the networked system 102 and other parties.

The networked system 102 may support a number of marketplaces that are customized, for example, for specific geographic regions. A version of the networked system 102 may be customized for the United Kingdom, whereas another version of the networked system 102 may be customized for the United States. Each of these versions may operate as an independent marketplace, or may be customized (or internationalized) presentations of a common underlying marketplace. The networked system 102 may accordingly include a number of internationalization applications 212 that customize information (and/or the presentation of information) on the networked system 102 according to predetermined criteria (e.g., geographic, demographic or marketplace criteria). For example, the internationalization applications 212 may be used to support the customization of information for a number of regional websites that are operated by the networked system 102 and that are accessible via respective web servers 116.

Navigation of the networked system 102 may be facilitated by one or more navigation applications 214. For example, a search application (as an example of a navigation application) may enable keyword searches of listings published via the networked system 102. A browsing application may allow users to browse various category, catalogue, or inventory data structures according to which listings may be classified within the networked system 102. Various other navigation applications may be provided to supplement the search and browsing applications.

In order to make listings, available via the networked system 102, as visually informing and attractive as possible, the marketplace applications 120 may include one or more imaging applications 216 which users may utilize to upload images for inclusion within listings. An imaging application 216 also operates to incorporate images within viewed listings. The imaging applications 216 may also support one or more promotional features, such as image galleries that are presented to potential buyers. For example, sellers may pay an additional fee to have an image included within a gallery of images for promoted items.

Listing creation applications 218 allow sellers to conveniently author listings pertaining to goods or services that they wish to transact via the networked system 102, and listing management applications 220 allow sellers to manage such listings. Specifically, where a particular seller has authored and/or published a large number of listings, the management of such listings may present a challenge. The listing management applications 220 provide a number of features (e.g., auto-relisting, inventory level monitors, etc.) to assist the seller in managing such listings. One or more post-listing management applications 222 also assist sellers with a number of activities that typically occur post-listing. For example, upon completion of an auction facilitated by one or more auction applications 202, a seller may wish to leave feedback regarding a particular buyer. To this end, a post-listing management application 222 may provide an interface to one or more reputation applications 208, so as to allow the seller to conveniently provide feedback regarding multiple buyers to the reputation applications 208.

Dispute resolution applications 224 provide mechanisms whereby disputes arising between transacting parties may be resolved. For example, the dispute resolution applications 224 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 226 implement fraud detection and prevention mechanisms to reduce the occurrence of fraud within the networked system 102.

Messaging applications 228 are responsible for the generation and delivery of messages to users of the networked system 102. Such messages may, for example, advise users regarding the status of listings at the networked system 102 (e.g., providing "outbid" notices to bidders during an auction process or providing promotional and merchandising information to users). Respective messaging applications 228 may utilize any one of a number of message delivery networks and platforms to deliver messages to users. For example, messaging applications 228 may deliver electronic mail (e-mail), instant message (IM), Short Message Service (SMS), text, facsimile, or voice (e.g., Voice over IP (VoIP)) messages via the wired (e.g., the Internet), plain old telephone service (POTS), or wireless (e.g., mobile, cellular, WiFi, WiMAX) networks.

Merchandising applications 530 support various merchandising functions that are made available to sellers to enable sellers to increase sales via the networked system 102. The merchandising applications 530 also operate the various merchandising features that may he invoked by sellers, and may monitor and track the success of merchandising strategies employed by sellers.

The networked system 102 itself, or one or more parties that transact via the networked system 102, may operate loyalty programs that are supported by one or more loyalty/promotions applications 532. For example, a buyer may earn loyalty or promotions points for each transaction established and/or concluded with a particular seller, and be offered a reward for which accumulated loyalty points can be redeemed.

As described earlier, in an example embodiment, user actions undertaken in a main process on one device may initiate a workflow on another device. For example, the user may be undertaking an auction item listing process (main process) on one device. When this listing process reaches a certain point, it may initiate a subprocess run on another device accessible to the user. In one example, the auction item listing process on a desktop computer may reach a point where the user is prompted to upload a photograph of the item to be listed. This may initiate a photo-taking subprocess on the user's mobile device (e.g., smartphone). This phototaking subprocess may then run the user through the steps of taking a photograph (or selecting a photograph from ones already stored on the mobile device). In some embodiments, the subprocess may then undertake on its own to pass output directly to a server (e.g., upload the photo directly to the auction listing server). In other embodiments, the subprocess may pass the output to the main process. Embodiments are also foreseen where the device running the subprocess can then pass the output of the subprocess, as well as control of the process, back to the original device (e.g., send the photo back to the main listing process, which itself will upload the photo).

It should be noted of course, that the actual main and secondary or sub-processes can operate on any computing devices. For example, there is nothing preventing the main process from running on a mobile device while the secondary process runs on a desktop computer.

Figure 3:
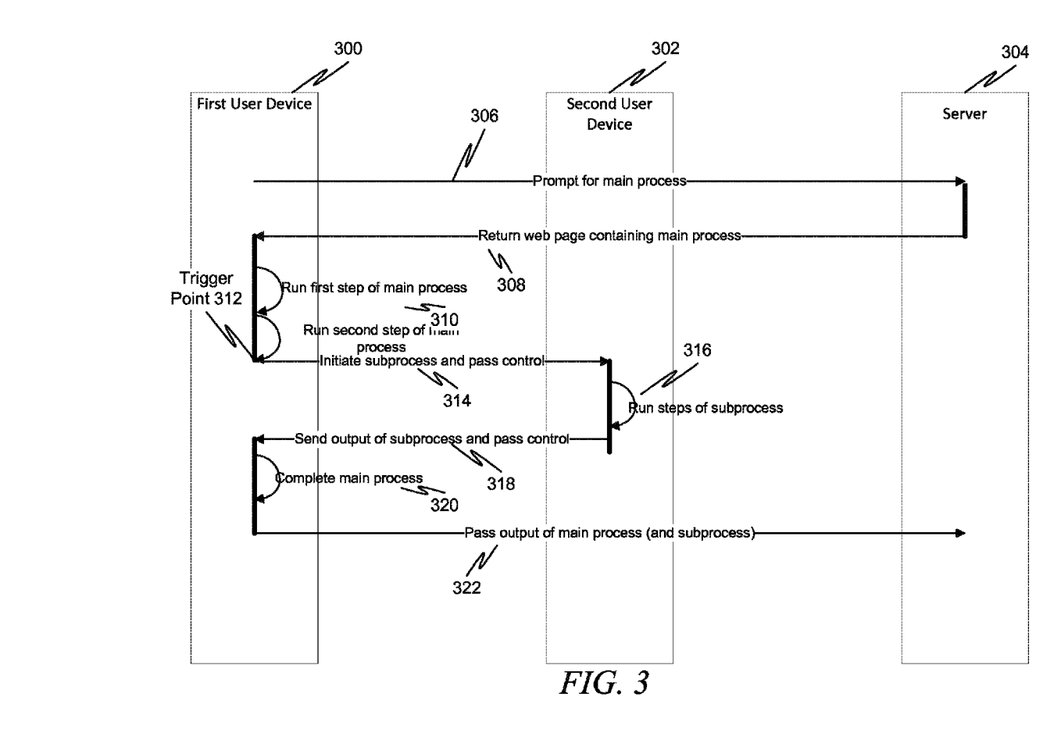
FIG. 3 is a diagram illustrating an auction listing method in accordance with an example embodiment.

FIG. 3 is a diagram illustrating a method in accordance with an example embodiment. As can be seen, a system may comprise a first user device 300, a second user device 302, and a server 304. At 306, the first user device 300 may prompt the server 304 for a main process. In one example, this may involve navigating a web browser to a web page hosted by the server 304. The server 304 may then serve a web page at 308 to first user device 300 that includes all or some of a main process of listing an item (in one example, the web page served is actually a series of web pages, each web page being served as the user completes a different stage of the main process, for example, when the user enters the title of the item on one web page, this title is passed back to the server 304, which then serves a web page asking the user to enter a description of the item. Nevertheless, in the embodiment depicted here, the server provides a single web page containing most or all of the main process).

At 310, the first user device 300 runs one or more steps of the main process. At 312, the main process reaches a point at which a subprocess workflow is initiated. This point is depicted as being after the user reaches a second step in the main process in FIG. 3, but this point may actually be any point in the process, in an example embodiment, the point at which the subprocess is initiated is predefined (e.g., determined prior to the main process starting). In another example embodiment, the point at which the subprocess is initiated may be dynamically determined while the main process is running. This point may be defined either by the creator of the main process (e.g., the auction listing web site), or by a user.

At 314, the subprocess is initiated on second user device 302, and control is passed to the second user device 302. By control is meant the ability of the user to continue with a process. In order to maintain version control, it may be desirable to prevent a user from continuing with a main process while the subprocess is still in progress. Thus, control is established so that the user can only execute steps in either the subprocess or the main process, but not both at the same time. The process that the user is permitted to control at any particular time is deemed to be the one that the user has "control" of, and passing control then involves changing the process of which the user has control.

At 316, the user executes the subprocess on the second user device 302, resulting in output. At 318, the subprocess then passes this output and control from second user device 302 to the main process on first user device 300. At 320, the main process then continues on first user device 300 until completion, eventually passing output (which includes the output generated by the subprocess and the output generated by the main process) to the server 304 at 322.

Figure 4:
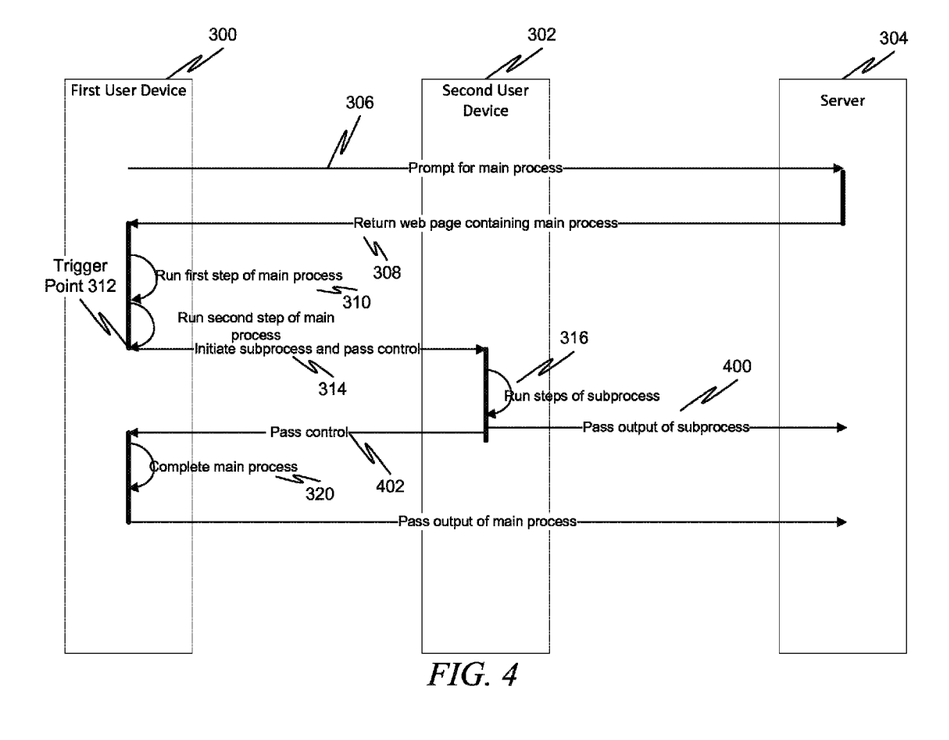
FIG. 4 is a diagram illustrating an auction listing method in accordance with another example embodiment.

FIG. 4 is a diagram illustrating a method in accordance with another example embodiment. This embodiment is similar to that of FIG. 3, however the output of the subprocess on second user device 302 is passed directly to the server 304 at 400, and only the control is passed back to the first user device 300 at 402.

Both FIGS. 3 and 4 depict example embodiments where control is eventually passed back to a main process on a first user device 300. However, embodiments are possible where the second user device 302 simply completes the rest of a main process. It should be noted that the term "subprocess" shall be construed broadly enough to encompass the idea of a process that completes without needing to pass control back to a main process. Nevertheless, it is also correct to refer to such a process as simply a second part of the main process, as will be described in FIG. 5. Alternatively, the term "secondary process" can simply be used to refer to either a subprocess or a second part of the main process—in other words, any process initiated by the main process to run on another device.

Figure 5:
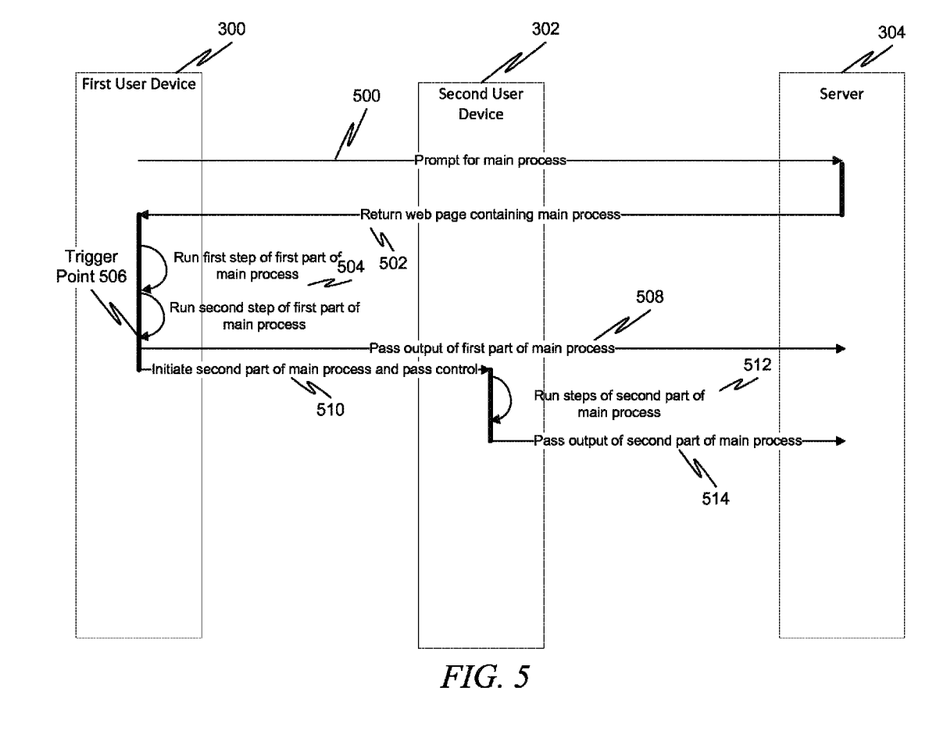
FIG. 5 is a diagram illustrating an auction listing method in accordance with another example embodiment.

FIG. 5 is a diagram illustrating a method in accordance with another example embodiment. At 500, the first user device 300 may prompt the server 304 for a main process. At 502, the server 304 may then serve a web page to first user device 300 that includes all or some of a main process.

At 504, the first user device 300 runs one or more steps of a first part of the main process. At 506, the main process reaches a point at which a second part of the main process is initiated. This point is depicted as being after the user reaches a second step in the main process in FIG. 5, but this point may actually be any point in the process. At 508, output from the steps of the first part of the main process may be sent to the server 304. It should be noted that this may actually occur at any point during the first part of the main process. For example, the first part of the main process may pass output back to the server 304 after each step is executed. At 510, the second part of the main process is initiated on second user device 302, and control is passed to the second user device 302. At 512, the user executes the second part of the main process on the second user device 302, resulting in output. At 514, the second part of the main process then passes this output from second user device 302 to the server 304.

While photo taking is described as one example of a subprocess (or second part of a main process) being executed on another device, the steps undertaken may actually comprise any part of a relevant process. Other examples include bar code scanning, serial or vehicle identification number input, radio frequency identification (RFID) scanning, taking photographs of a credit card or driver's license to provide identification and/or proof of possession of the card, etc.

Figure 6:
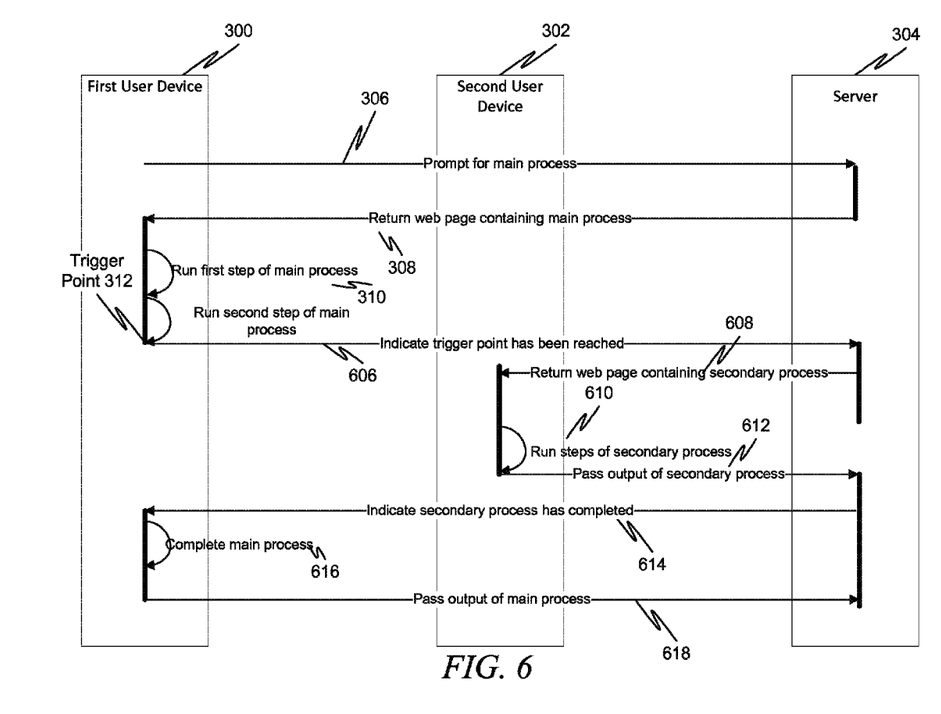
FIG. 6 is a diagram illustrating an auction listing method in accordance with another example embodiment.

FIG. 6 is an interaction diagram illustrating a method in accordance with another example embodiment. Here, the second user device may communicate directly with the server 304 without ever directly communicating with the first user device 300. At 306, the first user device 300 may prompt the server 304 for a main process. In one example, this may involve navigating a web browser to a web page hosted by the server 304. The server 304 may then serve a web page at 308 to first user device 300 that includes all or some of a main process (in one example, the web page served is actually a series of web pages, each web page being served as the user completes a different stage of the main process, for example, when the user enters the title of the item on one web page, this title is passed back to the server 304, which then serves a web page asking the user to enter a description of the item. Nevertheless, in the embodiment depicted here, the server provides a single web page containing most or all of the main process).

At 310, the first user device 300 runs one or more steps of the main process. At 312, the main process reaches a point at which a secondary process workflow is initiated. This point is depicted as being after the user reaches a second step in the main process in FIG. 3, but this point may actually be any point in the process. In an example embodiment, the point at which the subprocess is initiated is predefined (e.g., determined prior to the main process starting). In another example embodiment, the point at which the subprocess is initiated may be dynamically determined while the main process is running. This point may be defined either by the creator of the main process (e.g., the auction listing web site), or by a user.

At 606, the first user device 300 then indicates to the server 304 that the trigger point has been reached. At 608, the server 304 may return a web page containing the secondary process to the second user device 302. At 610, the steps of the secondary process may be executed and at 612, the output of the secondary process may be passed to the server 304.

At 614, an indication that the secondary process has completed may be passed from the server 304 to the first user device 300. This essentially resumes control of the process to the first user device 300. At 616, the first user device 300 can complete the main process. Then, at 618, the output of the main process may be passed to the server 304.

Figure 7:
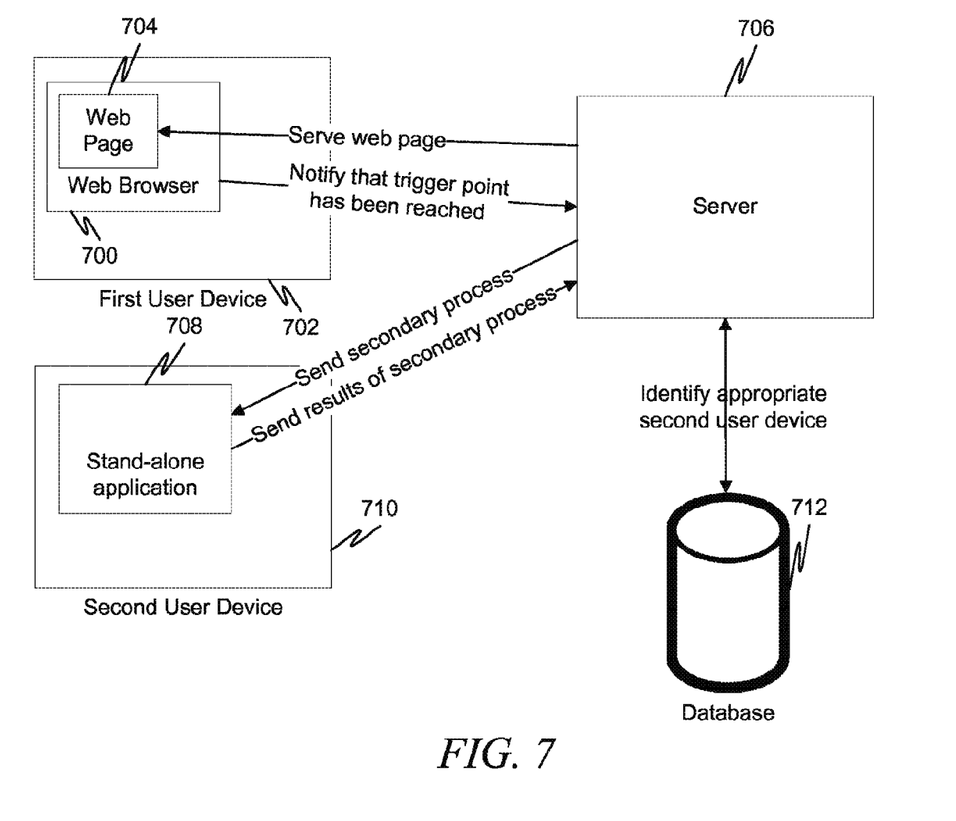
FIG. 7 is a block diagram illustrating a system in accordance with an example embodiment.

When the main process reaches the point at which a secondary process (subprocess or second part of the main process) needs to be initiated on another device, it may be necessary for a determination to be made about which other device to initiate this secondary process (or second part of the main process), as well as how the secondary process should be presented. There are many different configurations allowing for such determinations, some of which will be presented herein. FIG. 7 is a block diagram illustrating a system in accordance with an example embodiment. Here, the main process operates in a web browser 700 on a first user device 702, running a web page 704 served by a server 706. A stand-alone application 708 then operates on a second user device 710. Upon reaching a point in the main process at which the secondary process should be initiated, the web browser 700 then notifies the server 706 that this point has been reached. The server 706 then identifies an appropriate user device on which to initiate the secondary process. This may involve, for example, looking up stored device information specific to the user in a user account stored on a database 712. For example, the server 706 may maintain an account for the user. In order to obtain the web page 704 or to begin the main process, the user may be required to enter a user name and password (or other credentials). This may uniquely identify the user's account. The user may have previously registered the second user device 710 with the server 706 under this account, and identified it as an appropriate device on which to initiate secondary processes. Thus, upon receiving a notification from the first user device 702 that the point in the main process has been reached, the server may then send a secondary process to the stand-alone application 708 on the second user device 710. Alternatively, the stand-alone application 708 may actually contain the secondary process already, and the server 706 simply sends a message requesting that the stand-alone application 708 run the secondary process.

Figure 8:
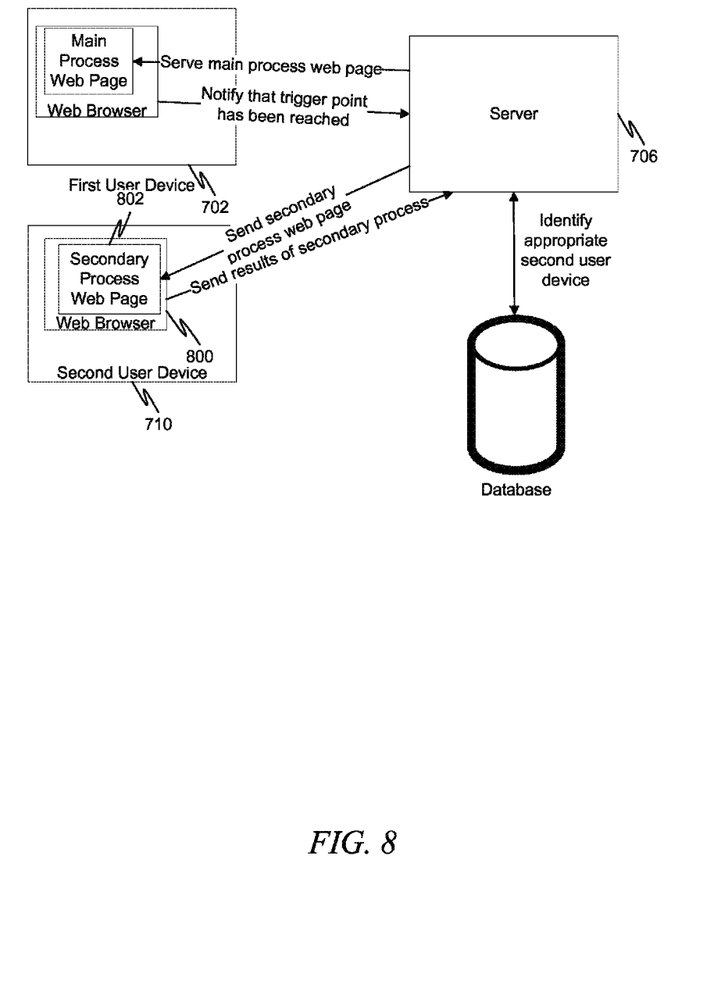
FIG. 8 is a block diagram illustrating a system in accordance with another example embodiment.

FIG. 8 is a block diagram illustrating a system in accordance with another example embodiment. Here, rather than a stand-alone application, the second user device 710 actually contains a web browser 800. Upon receiving a notification from the first user device 702 that the point in the main process has been reached, the server 706 may then send a secondary process (embodied by, for example, a web page 802) to the web browser 700 on the second user device 710.

In another example embodiment, state information about the steps in a main process are saved periodically, allowing the user to restart a session at the same spot he left off, should the session be terminated. The state information may be gathered and stored in a number of different ways. In one example embodiment, the state information is stored on the device on which the user session was begun. In another example embodiment, the state information is stored on a centralized server. In another example embodiment, the state information is stored in a cloud.

The state information that is stored may include, for example, the information entered about the item listing, as well as information about the point where the listing process left off.

Communication between and among the first and second user devices 702 and 710 and the server 706 can be accomplished via a number of different mechanisms. In an example embodiment, the connection between the first user device 702 and the server 706 is via a traditional Internet connection, wherein the first user device 702 is connected (either directly, or indirectly via a local wireless network such as an IEEE 802.11-compliant network) to a modem or router, which connects via a hard wire (such as a cable modem over coaxial or fiber-optic cable, or a digital subscriber line over a telephone wire) to an internet service provider (ISP). The ISP is then connected generally to the Internet, and the server 706 is accessible over the Internet. Furthermore, in the embodiment where the second user device 710 is a mobile device, the server 706 may communicate with the second user device 710 via a cellular network, such as a code division multiple access (CDMA) or Global System for Mobile communication (GSM) network.

Figure 9:
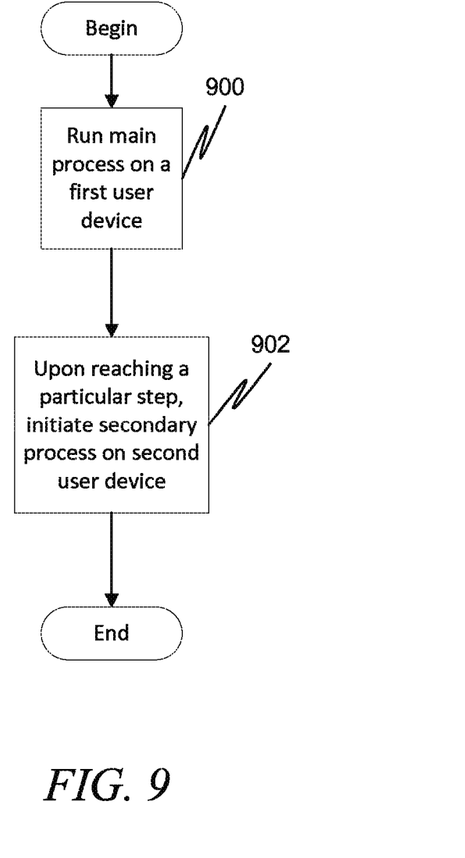
FIG. 9 is a flow diagram illustrating a method for initiating a secondary process on a first user device in accordance with an example embodiment.

FIG. 9 is a flow diagram illustrating a method for initiating a secondary process on a first user device in accordance with an example embodiment. At 900, a main process is run on the first user device. This main process may comprise a plurality of steps. One of these steps referred to as a "particular" step, but also may be referred to as a initiating step) may be identified as the step that will initiate a secondary process. At 902, upon reaching the particular step, a secondary process is initiated on a second user device.

Figure 10:
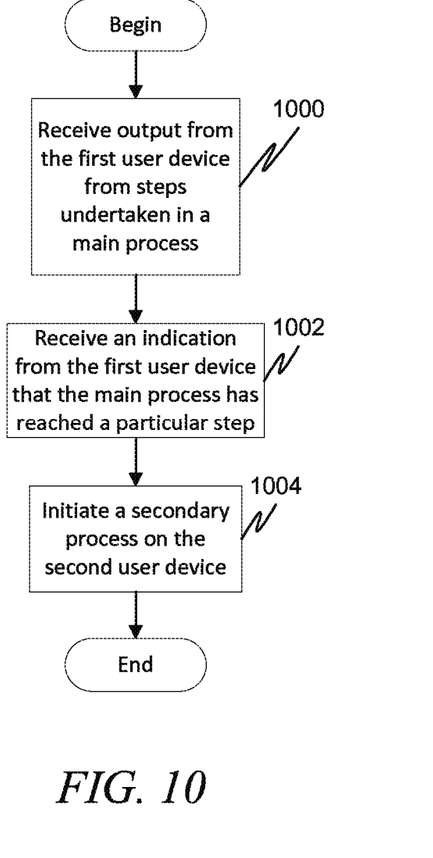
FIG. 10 is a flow diagram illustrating a method for initiating a secondary process at a server in accordance with another example embodiment.

FIG. 10 is a flow diagram illustrating a method for initiating a secondary process at a server in accordance with another example embodiment. The server may be in a system that also includes a first user device and a second user device. At 1000, the server receives output from the first user device from steps undertaken in a main process operating on the first user device. At 1002, the server receives an indication from the first user device that the main process has reached a particular step. At 1004, in response to receipt of the indication, the server triggers a secondary process on the second user device.

Figure 11:
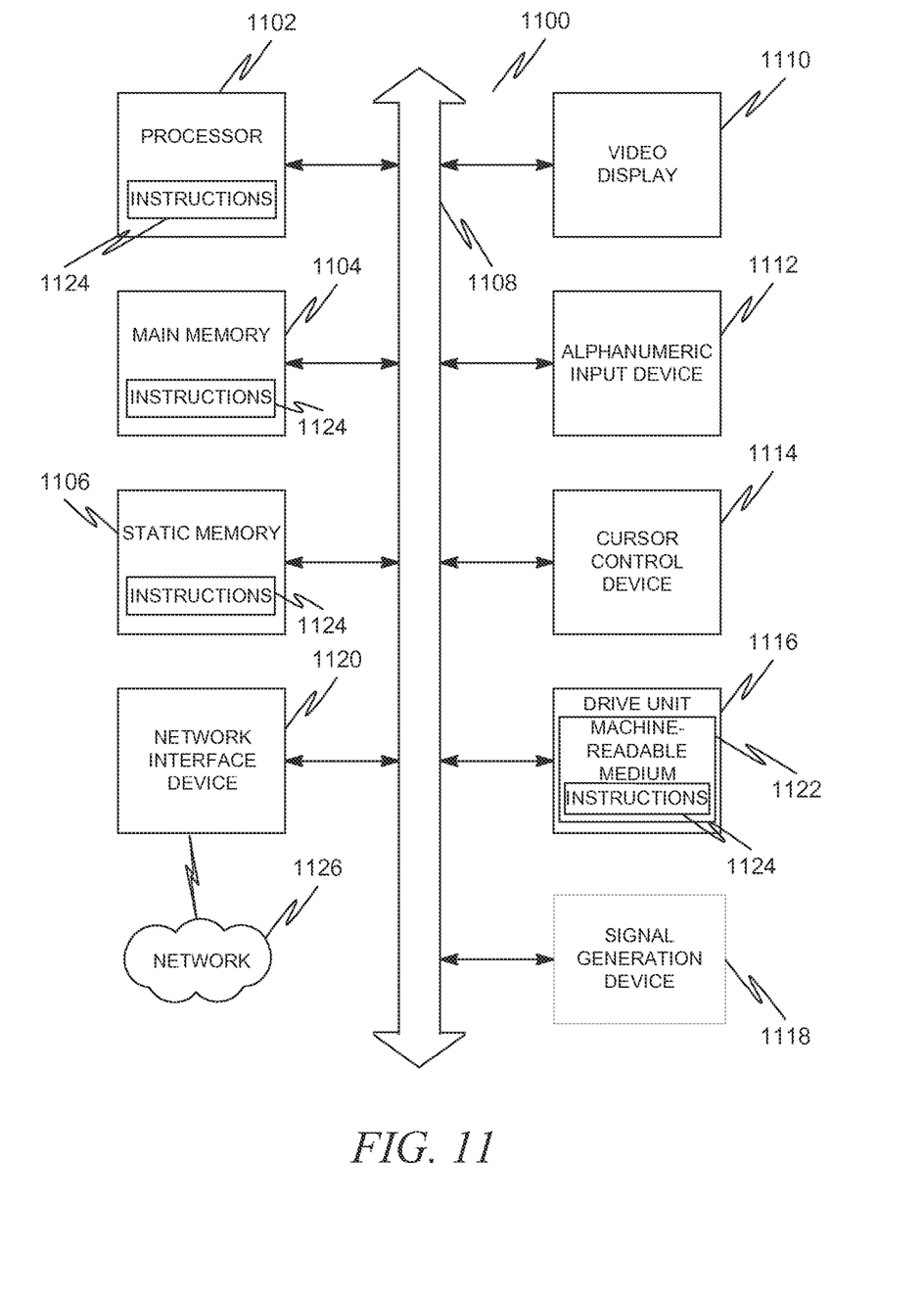
FIG. 11 shows a diagrammatic representation of a machine in the example form of a computer system within which a set of instructions, for causing the machine to perform any one or more of the methodologies discussed herein, may be executed.

FIG. 11 shows a diagrammatic representation of machine in the example form of a computer system 1100 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in it peer-to-peer (or distributed) network environment. The machine may be a server computer, a client computer, a personal computer (PC), a tablet PC, a set-top box (STB), a personal digital assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU) a graphics processing unit (GPU) or both), a main memory 1104 and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alphanumeric input device 1112 (e.g., a keyboard), a cursor control device 1114 (e.g., a mouse), a disk drive unit 1116, a signal generation device 1118 (e.g., a speaker) and a network interface device 1120.

The disk drive unit 1116 includes a machine-readable medium 1122 on which is stored one or more sets of instructions (e.g., software 1124) embodying any one or more of the methodologies or functions described herein. The software 1124 may also reside, completely or at least partially, within the main memory 1104, static memory 1106 and/or within the processor 1102 during execution thereof by the computer system 1100, the main memory 1104, static memory 1106 and the processor 1102 also constituting machine-readable media.

The software 1124 may further be transmitted or received over a network 1126 via the network interface device 1120.

While the machine-readable medium 1122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 107 §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The invention claimed is:

1. A method for initiating from a first user device a secondary process on a second user device, comprising:
   prompting a server for a main process;
   receiving the main process from the server, the main process embedded in a web page;
   running the main process on the first user device by executing the web page in a web browser operating on the first user device, the main process comprising a plurality of steps;
   upon reaching a particular step of the plurality of steps in the main process, issuing a command directly, from the first user device without going through the server, to the second user device requesting that a secondary process be loaded in a stand-alone application on the second user device, the issuing of the command causing launching of the secondary process on the second user device in response to the second user device receiving the command, and passing control to the second user device, the second user device being a mobile device, the secondary process causing the second user device to send output directly to the server, bypassing the first user device and the main process;
   wherein in response to passing the control to the second user device, the main process on the first device is prevented from continuing while the secondary process is in progress;
   receiving control back from the second user device, permitting the main process on the first device to continue;
   completing the main process; and
   sending output of the main process directly to the server.

2. The method of claim 1, wherein the secondary process is a subprocess.

3. The method of claim 1, wherein the secondary process is a second part of the main process.

4. The method of claim 1, wherein the second user device is a mobile device.

5. The method of claim 4, wherein the secondary process includes steps to take a photograph using a camera on the second user device.

6. The method of claim 5, wherein the secondary process includes uploading a photograph to a server.

7. The method of claim 5, wherein the secondary process includes sending a photograph to the main process on the first user device.

8. The method of claim 4, wherein the secondary process includes steps undertaken to scan a barcode using a camera on the second user device.

9. A method for initiating a secondary process at a server, in a system comprising the server, a first user device, and a second user device, comprising:
   receiving output generated by a main process operating on the first user device;
   receiving an indication from the first user device that the main process has reached a particular step;
   receiving an indication that control has been passed to the second user device directly from the first user device without going through the server by the first user device issuing a command directly, without going through the server, to the second user device requesting that a secondary process be loaded in a stand-alone application on the second user device, wherein in response to passing the control to the second user device, the main process on the first device is prevented from continuing while the secondary process is in progress;
   in response to the receipt of the indication, initiating a secondary process on the second user device;
   receiving output of the secondary process directly from the second user device;
   receiving an indication that control has been passed from the second user device to the first user device, permitting the main process on the first device to continue;

notifying the first user device that control has been passed from the second user device to the first user device; and receiving output from the main process directly from the first user device.

10. A computer-implemented system comprising:

a first user device including:

at least one processor coupled to a memory;

an application configured to prompt a server for a main process;

receive the main process from the server, the main process embedded in a web page;

run the main process on the first user device by executing the web page in a web browser operating on the first user device, the main process comprising a plurality of steps;

upon reaching a particular step of the plurality of steps in the main process, issue a command directly, from the first user device without going through the server, to the second user device requesting that a secondary process be loaded in a stand-alone application on the second user device, the issuing of the command causing launching of the secondary process on the second user device in response to the second user device receiving the command, and passing control to the second user device, the second user device being a mobile device, the secondary process causing the second user device to send output directly to the server, bypassing the first user device and the main process;

wherein in response to passing the control to the second user device, the main process on the first device is prevented from continuing while the secondary process is in progress;

receive control back from the second user device, permitting the main process on the first device to continue;

complete the main process; and send output of the main process directly to the server.

11. A machine-readable non-transitory storage medium having instruction data to cause a machine to execute operations for initiating from a first user device secondary process on a second user device, the operations comprising:

prompting a server for a main process;

receiving the main process from the server, the main process embedded in a web page;

running the main process on the first user device by executing the web page in a web browser operating on the first user device, the main process comprising a plurality of steps;

upon reaching a particular step of the plurality of steps in the main process, issuing a command directly, from the first user device without going through the server, to the second user device requesting that a secondary process be loaded in a stand-alone application on the second user device, the issuing of the command causing launching of the secondary process on the second user device in response to the second user device receiving the command, and passing control to the second user device, the second user device being a mobile device, the secondary process causing the second user device to send output directly to the server, bypassing the first user device and the main process;

wherein in response to passing the control to the second user device, the main process on the first device is prevented from continuing while the secondary process is in progress;

receiving control back from the second user device, permitting the main process on the first device to continue;

completing the main process; and sending output of the main process directly to the server.

12. A machine-readable non-transitory storage medium having instruction data to cause a machine to execute operations for initiating a secondary process at a server, in a system comprising the server, a first user device, and a second user device, the operations comprising:

receiving output generated by a main process operating on the first user device;

receiving an indication from the first user device that the main process has reached a particular step;

receiving an indication that control has been passed to the second user device directly from the first user device without going through the server by the first user device issuing a command directly, without going through the server, to the second user device requesting that a secondary process be loaded in a stand-alone application on the second user device, wherein in response to passing the control to the second user device, the main process on the first device is prevented from continuing while the secondary process is in progress;

in response to the receipt of the indication, initiating a secondary process on the second user device;

receiving output of the secondary process directly from the second user device;

receiving an indication that control has been passed from the second user device to the first user device, permitting the main process on the first device to continue;

notifying the first user device that control has been passed from the second user device to the first user device; and receiving output from the main process directly from the first user device.

* * * * *